April 21, 1964 R. F. PERTUSIO ETAL 3,129,766
ROTOR BLADE RETENTION MEANS
Filed April 27, 1961 3 Sheets-Sheet 1

INVENTORS
RENE F. PERTUSIO
ALEX BERMAN
BY
*Teller, McCormick, Paulding & Huber*
ATTORNEYS

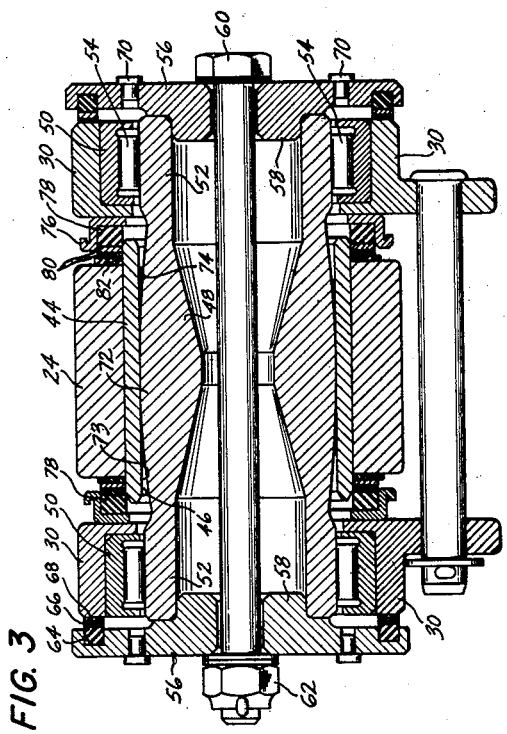

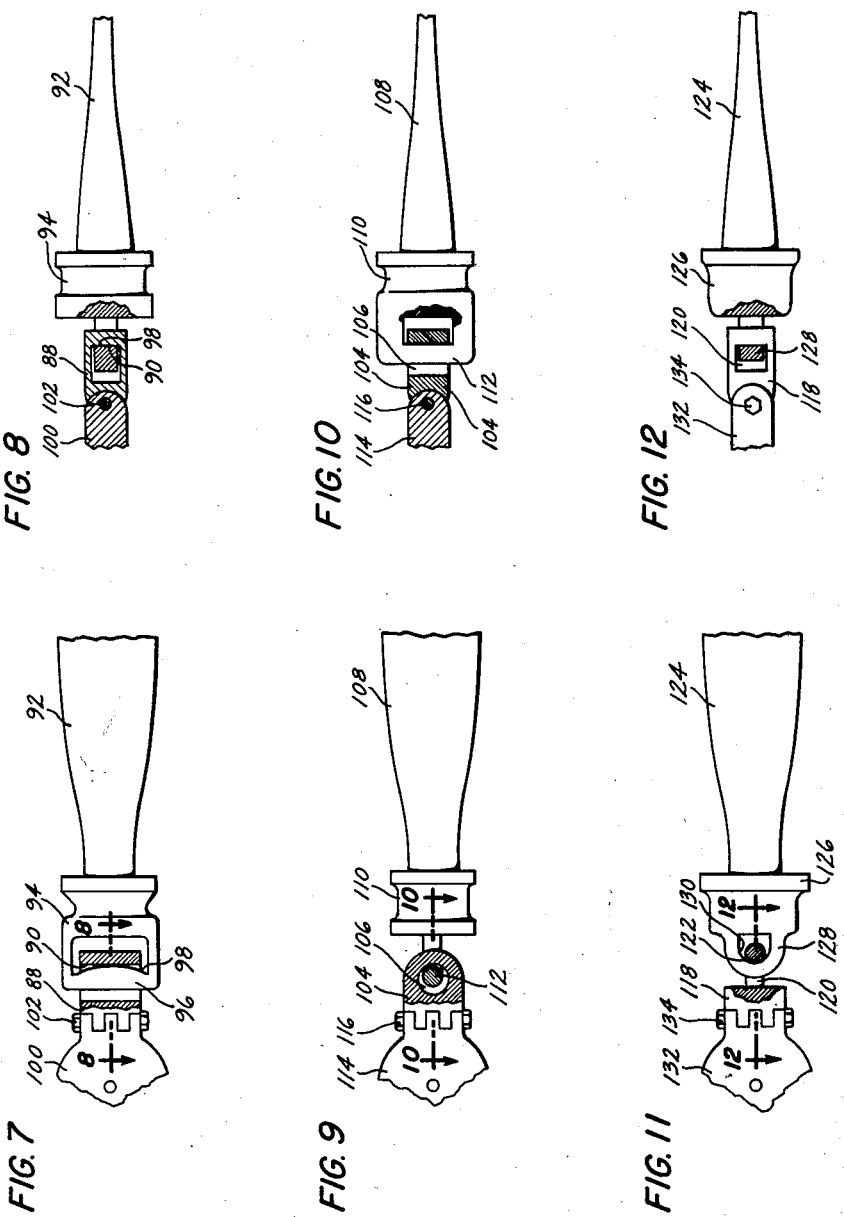

United States Patent Office 3,129,766
Patented Apr. 21, 1964

3,129,766
ROTOR BLADE RETENTION MEANS
Rene F. Pertusio, Springfield, Mass., and Alex Berman, Bloomfield, Conn., assignors to Kaman Aircraft Corporation, a corporation of Connecticut
Filed Apr. 27, 1961, Ser. No. 106,048
13 Claims. (Cl. 170—160.51)

This invention relates to aircraft rotor assemblies, and deals more particularly with an improved retention means for connecting a rotor blade to its hub.

The rotor blade connecting or retention means of the present invention is shown and discussed herein as applied to the tail rotor of a helicopter, the invention having particular utility in such rotors. Nevertheless, it is to be understood at the outset that there is no intention to so limit the invention, and that in proper cases the invention may be applied to the construction of other types of aircraft rotors, such as the main lifting rotor of a helicopter or the propellers of an airplane.

In the past it has been common practice in the construction of helicopter tail rotors to mount the individual blades of the rotor to the hub in such a manner as to be either rigid or freely pivotable in the lead and lag direction. Each of these types of mounting, however, has its own disadvantages. If the blades are held rigid in the lead and lag plane, the loads induced by a blade attempting to lead or lag may cause excessive bending strains in the blade and mounting structure. This effect may be further accentuated due to the fact that this type of retention often is characterized by the rotor blade so restrained having a natural frequency equal to or nearly equal to some low multiple of the rotational frequency, thus causing large amplification of these bending strains. Allowing the blade to pivot freely in the lead and lag plane largely eliminates these strains in the region of the retention, but in turn makes for a more complicated structure and results in greater weight and cost of manufacture. In addition, when the freely pivoting retention is used on a main rotor, it is generally necessary to employ a damping mechanism in order to suppress mechanical instability due to dynamic coupling between lead and lag motion and the modes of motion of the aircraft on its landing gear when on the ground or with the modes of motion of the pylon or a supporting wing structure when in flight.

The general object of this invention is therefore to provide a rotor blade retention means which avoids both the large bending stresses and the possibility of a resonant blade vibration present in a rigid blade connection and the complexity, additional weight, and possible need for external damping devices present in a freely pivoting blade connection.

Another object of this invention is to provide a rotor blade retention having dynamic characteristics falling between those of a perfectly rigid blade connection and a freely pivoting connection.

A further object of this invention is to provide a rotor blade retention which allows the blade to swing in the lead and lag direction, and which in addition acts dynamically to change the natural frequency of the blade so as to be different from the frequency of the periodic driving forces produced as a result of the rotor rotation. In keeping with this object of the invention it is a still further object to provide a simple and effective means for changing the natural frequency of the blade from that of a conventional freely pivoting blade and which means includes no springs, dampers or other auxiliary devices.

Another object of this invention is to provide a rotor blade retention means of the above character whereby the blade is connected to a hub and capable of both flapping and lead and lag motion.

Other objects and advantages of the invention will be apparent from the following description and from the drawings forming a part thereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 3 is a sectional view taken on the line 3—3 of FIG. 2 and showing the structure of the blade retention means employed in the tail rotor assembly of FIGS. 1 and 2.

FIGS. 4 and 5 are schematic views illustrating the operation of the blade retention means of FIG. 3.

FIG. 6 is a diagram illustrating the relationship between the centrifugal force imposed on a blade and the geometry of the blade retention means of FIG. 3.

FIG. 7 is a schematic illustration of a blade retention means comprising an alternative embodiment of this invention, the view being taken looking toward the outer end of the hub with part of the hub mounting arm being broken away to show the structure of the blade grip.

FIG. 8 is a partly elevational and partly sectional view taken on the line 8—8 of FIG. 7.

FIG. 9 is a schematic illustration of a blade retention means comprising another alternative embodiment of this invention, the view being taken looking toward the outer end of the hub and part of the hub mounting arm being broken away to show the structure of the blade grip.

FIG. 10 is a partly elevational and partly sectional view taken on the line 10—10 of FIG. 9.

FIG. 11 is a schematic illustration of a blade retention means comprising still another alternative embodiment of this invention, the view being taken looking toward the outer end of the hub and part of the hub mounting arm being broken away to show the structure of the blade grip.

FIG. 12 is a partly elevational and partly sectional view taken on the line 12—12 of FIG. 11.

Figure 1:
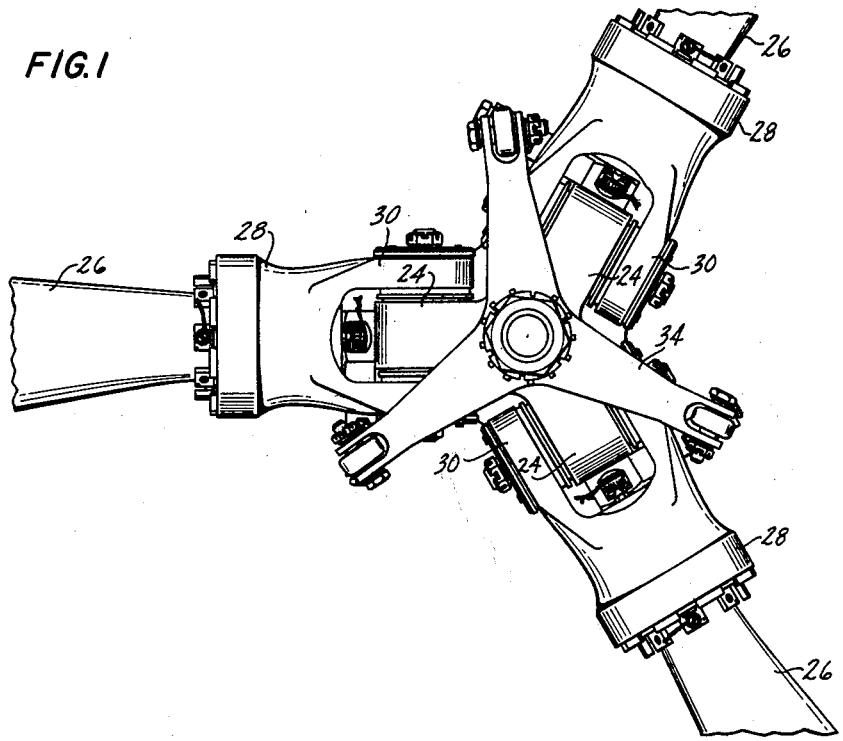
FIG. 1 is an end elevational view of a tail rotor assembly embodying the present invention and which view shows only the inboard ends of the rotor blades.
Figure 2:
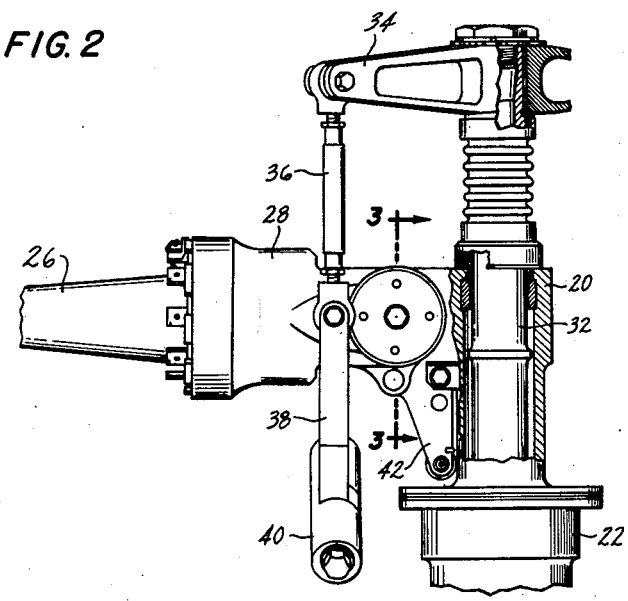
FIG. 2 is a longitudinal elevational view of the rotor assembly of FIG. 1 with various parts being broken away to show more clearly the structure of other parts.

*General Description of Rotor Assembly—FIGS. 1 and 2*

FIGS. 1 and 2 show in general a tail rotor assembly for a helicopter including a retention means embodying this invention for connecting the rotor blades to their respective hub mounting arms. It should be understood, however, that this rotor assembly is shown by way of example only and that the blade retention means of this invention may be incorporated into other types of rotors without departing from the invention.

Referring to FIGS. 1 and 2 the illustrated rotor assembly includes a hub 20 connected with a shaft 22 for rotation about its central axis. The shaft 22 is, in turn, connected by means of suitable gearing and the like, not shown, to the helicopter engine. The hub 20 is adapted for use with three rotor blades and accordingly is provided with three mounting arms 24, 24 which extend radially outwardly from the center portion of the hub and to which the rotor blades are connected by the retention means of the present invention. As viewed in FIG. 1, the three hub mounting arms 24, 24 are equally angularly spaced about the axis of the hub.

The blades associated with the hub 20 are indicated at 26, 26 and only the inboard end portions thereof are shown in FIGS. 1 and 2. The blades are of a conventional construction and at their inboard ends are provided with blade grips 28, 28. As shown best in FIG. 1, each blade grip 28 is bifurcated to provide two transversely spaced mounting arms 30, 30 located one on either side of the associated hub mounting arm 24. As brought out in more detail hereinafter, each hub mounting arm 24 is provided with a transverse opening which in turn receives a transverse pin carried by the two mounting arms of the associated blade grip to connect the blade grip and blade to the hub.

In addition to functioning to connect the blades 26, 26 to the hub 20, the blade grips 28, 28 also serve to support the body portions of the blades 26, 26 for pivotal movement about spanwise axes to change the pitch or incidence of the blades for the purpose of controlling the thrust of the rotor. The structure for pivotally connecting the body portions of the blades 26, 26 to the associated blade grips 28, 28 forms no part of this invention and may be of conventional construction.

The pitches of the blades 26, 26 are controlled collectively by a pitch control rod 32 housed coaxially within the hub 20 and the drive shaft 22 and which rod extends some distance beyond the outer end of the hub. The control rod is supported for axial sliding movement relative to the hub 20, in response to movement of one or more of the pilot operated flight controls, and at its outer end is provided with a three-armed spider 34. Each arm of the spider 34 is connected by means of a link 36 to a corresponding pitch lever 38. The lever 38 is connected to the body portion of the associated blade 26 through the blade grip 28 and serves to change the pitch of a blade in response to movement of the link 36 by the spider 34. As shown, each of the pitch levers may include a flyweight 40, to aid in counteracting the aerodynamic forces imposed on the associated blade.

From the description of the blade retention means which follows, it will be noted that each blade 26 is permitted to move relative to the hub both in a lead and lag direction and in a flapping direction. Lead and lag motion of the blade is that motion which occurs in the path or plane of the blade rotation and whereby the blade during its rotation tends to either lead or lag the position of its associated hub mounting arm. Flapping motion of a blade is that motion which occurs about an axis generally normal to the axis of rotation. At a zero flapping angle the blades extend substantially radially outwardly from the hub axis and sweep out a plane surface as the hub rotates. At other flapping angles the blades travel in a conical path and any lead or lag motion of the blades occurs in the path of rotation about an axis substantially perpendicular to the path or conical surface swept out by the blades.

In order to prevent the blades from moving about their flapping axes during periods when the helicopter is on the ground and the rotor stopped, each blade has associated therewith a centrifugally operated flapping stop for locking the blade in a fixed position about its flapping axis. Such a stop is indicated generally at 42 in FIG. 2. During inactive periods the stop 42 holds the associated blade in the position shown in FIG. 2, but as the hub rotates the stop releases the blade to permit the same to partake of flapping motion.

*Structure of Blade Retention Means—FIG. 3*

Reference is now made to FIG. 3 which shows in detail the construction of the blade retention means employed in the rotor assembly of FIGS. 1 and 2.

The hub mounting arm 24 is located centrally of the retention assembly and is provided with a transverse opening which receives a liner 44. The liner extends some distance beyond the sides of the mounting arm at both of its ends and is provided with a cylindrical bore or opening 46. Passing through the opening 46 is a transverse pivot pin 48 supported by the blade grip arms 30, 30.

Preferably, and as shown, the pivot pin 48 is rotatively supported by means of anti-friction bearings from the blade grip arms 30, 30 to allow rotation of the blade grip arm about the axis of the pin to in turn produce flapping motion of the blade. To accommodate such bearings each blade grip arm 30 is provided with a counterbored opening which receives the outer race 50 of a roller bearing assembly. The pivot pin 48 at each of its ends is provided with a cylindrical portion 52 which fits through the opening in the associated blade grip arm and forms the inner race of the bearing assembly. Between each outer race 50 and the associated cylindrical portion 52 of the pin 48 is an annular series of roller bearing elements 54, 54 which function in a conventional manner to rotatively support the blade grip arm with respect to the pivot pin.

The pivot pin 48 is held axially in place with respect to the blade grip arms 30, 30 by means of two end caps 56, 56 located respectively at its opposite ends. The pivot pin 48 is of a hollow construction, as shown, and each end cap 56 is provided with an inwardly facing cylindrical portion 58 received by the bore of the pivot pin so as to hold the cap in a fixed radial position relative to the pin. The end caps are held in axial position relative to the pivot pin by a tie bolt 60 which extends through the pivot pin and the two end caps and has a nut 62 threaded onto its free end to tightly clamp the end caps against the end surfaces of the pivot pin, thereby holding the end caps and the pivot pin together as a rigid assembly.

The end caps 56, 56 extend radially outwardly beyond the counterbored openings in the blade grip arms 30, 30 and are provided with inwardly facing annular recesses for receiving ring units which function as lubricant seals and thrust bearings between the end caps and the associated blade grip arms 30, 30. As shown in FIG. 3 each of these ring units consists of a ring 64 of resilient material having bonded thereto a metal washer 66 and a Teflon ring 68. Also included in the end caps 56, 56 are one or more lubricant fittings 70, 70 for use in supplying lubricant to the retention assembly.

Between its two cylindrical end portions 52, 52 the pivot pin 48 has an intermediate portion 72 which is curved along the length of the pin so as to have a varying diameter, the outer surface 74 of the intermediate portion being a surface of revolution about the axis of the pin. As shown in FIG. 3, the maximum diameter of the intermediate portion 72 occurs at the center of the pin and the diameter decreases gradually on either side of the center so as to give the pivot pin 48 a generally barrel-shaped appearance. The wall surface 73 of the opening 46 in the liner 44 and the outer curved surface 74 of the pin 48 therefore define two bearing surfaces which coengage to restrain the blade and blade grip against radial outward movement relative to the hub. In addition, the curvature of the pin surface 74 permits a rocking or rolling motion of the pin relative to the surface 73 of the hub mounting arm to permit movement of the blade and the blade grip relative to the hub mounting arm in the path of blade rotation. That is, as the blade and blade grip move in a lead or lag direction the pin surface 74 rolls relatively to the mounting arm surface 73 and this rolling motion in turn changes the location of the point of contact between the two bearing surfaces. At any position of the blade relative to the hub mounting arm the point of contact between the two bearing surfaces 73 and 74 is the momentary lead and lag axis about which the blade pivots in partaking of a lead and lag motion. Therefore, shifting the point of contact is equivalent to shifting the lead and lag axis, and this has a desirable effect on the dynamic characteristics of the blade as will be explained in more detail hereinafter.

At this point it should be noted with respect to the structure shown in FIG. 3 that the diameter of the opening 46 in the liner 44 is substantially equal to the maximum diameter of the barrel-shaped pin portion 72. It would therefore appear that little rocking motion of the pin would be possible without causing a binding action between the pin and the liner. In use, however, the centrifugal force imposed on the blade and blade grip presses the pin with sufficient force against the sleeve 44 as to slightly compress the sleeve and pin in the zone of coengagement and to thereby provide sufficient clearance between the pin and the sleeve on the opposite side of the pin to permit the desired rocking motion.

Means are also provided in the blade retention of FIG. 3 for holding the blade grip in a generally transversely centered position relative to the hub mounting arm 24 and for resisting transverse sliding movement of the pin relative to the mounting arm. This means in turn consists of two resilient means located on either side of the mounting arm 24 and between the mounting arm and the adjacent blade grip arm 30 so as to act in opposition to each other and against the hub arm for urging the blade grip toward a transversely centered position. As shown, each of these resilient means includes a metal retaining ring 76 which surrounds the pivot pin 48 and on one side bears against the associated blade grip arm 30. Carried by the metal retaining ring is a ring 78 of resilient material which cooperates with two metal washers or shims 80, 80 and a Teflon ring 82. The two resilient rings 78, 78 in their undeformed condition prior to their incorporation into the retention of FIG. 3 are of substantially larger axial dimension than shown in FIG. 3. Therefore, when placed in the retention assembly the rings are axially compressed between the hub mounting arm and the blade grip arms.

In addition to serving as a means for biasing the blade grip to a transversely centered position, the elements 76 to 82 also tend to resist movement of the associated blade 26 from its neutral or zero position in the lead and lag direction and when the rotor rotation is stopped with the helicopter on the ground will act in conjunction with the flapping stop 42 to hold the blade in a generally fixed position relative to the hub. The force exerted on the blade by the biasing means and tending to restore the blade to its zero lead and lag position also aids the similar dynamic restoring force produced during rotor rotation by the retention means, but generally the biasing force is small compared to the dynamic force so that the restoring action of the dynamic force predominates. It will also be noted that the elements 76 to 82 provide an effective lubricant seal between the hub mounting arm and the blade grip mounting arms.

*Operation of Blade Retention Means—FIGS. 4, 5 and 6*

The manner in which the blade retention of FIG. 3 operates to enable lead or lag motion of the associated blade 26 is best understood by reference to the schematic illustration of FIGS. 4 and 5. FIG. 6 illustrates diagrammatically the retention geometry and the centrifugal forces acting on the blade.

Referring first to FIGS. 4 and 5, FIG. 4 shows the blade 26 positioned at a zero lead-lag angle with respect to the hub mounting arm 24. In this position, the pivot pin 48 contacts the inner surface or wall of the mounting arm opening 46 at the point marked A. The point A is located at the maximum diameter of the pivot pin 48 and on the radial line 84 drawn from the axis O of the hub 20 through the transverse center of the mounting arm 24.

FIG. 5 is similar to FIG. 4 but shows the blade 26 in a lagging position. That is, as the hub and blade rotate in a counterclockwise direction, as shown by the arrow, the blade 26 lags behind the radial line 84. As the blade 26 moves from the zero position of FIG. 4 to the lagging position of FIG. 5 the curved surface of the pin 48 rolls with respect to the surface of the opening 46 so that the contact point between the pin and the mounting arm is moved from the point A to the point A' which latter point is located some distance from the radial center line 84. It will be understood that the contact points A and A' in FIGS. 4 and 5 are the momentary pivot points for the lead and lag motion of the blade 26. Thus, the effect of the blade retention is to cause a change in the location of the lead and lag pivot axis in response to the lead and lag motion of the blade. For every position of the blade in its lead and lag path of movement there therefore corresponds a different pivot point.

The effect of this shifting of the lead and lag pivot point may be better understood by reference to FIG. 6. In this figure the reference numeral 73 again indicates the inner surface of the opening in the hub mounting arm 24 (or actually in the liner 44), and the reference numeral 74 indicates the curved surface of the pivot pin 48, the curvature being somewhat exaggerated in this view for reasons of clarity.

The meanings of the other reference characters in FIG. 6 are as follows:

O indicates the hub axis of rotation.
A' indicates the point of contact between the bearing surfaces 73 and 74.
C.G. indicates the center of gravity of the blade.
C indicates the center of curvature of the surface 74.
B indicates the intersection between the surface 74 and a line drawn from C to C.G.
$\Omega$ = angular velocity of the hub.
$\gamma$ = the lag angle of the blade.
$\epsilon$ = angular displacement of the blade center of gravity.
$R_c$ = radius of curvature of the pin surface 74.
$e$ = distance between hub axis O and surface 73.
$r_b$ = distance from surface 74 to C.G. along the line drawn from C to C.G.
$r_0$ = distance from hub axis O to C.G.
$M$ = mass of the blade.

In FIG. 6 it is assumed that the view is taken along a surface or plane lying in the path of the blade rotation and in this path the surface 73 is assumed to be straight and the surface 74 circular or of constant radius, as is the case with the structure of FIG. 3.

Therefore, assuming that the hub is rotated at a constant velocity of $\Omega$ radians per second, a centrifugal force of $F = \Omega^2 r_0 M$ will be exerted on the blade 26 and may be considered as acting on the center of gravity of the blade and through the hub axis O. This force in turn tends to pivot the blade about its momentary lead-lag axis A'. The net turning effort may be obtained by summing the moments about the point A' produced by the components of the centrifugal force. Considering a counterclockwise moment to be positive, it will be noted from FIG. 6 that:

$$M_{A'} = (\Omega^2 r_0 M \cos \epsilon)[(R_c + r_b) \sin \gamma] \\ - (\Omega^2 r_0 M \sin \epsilon)[(R_c + r_b) \cos \gamma - R_c] \quad (1)$$

But, $$r_0 \cos \epsilon = (R_c + r_b) \cos \gamma - R_c + e \quad (2)$$

and $$r_0 \sin \epsilon = (R_c + r_b) \sin \gamma - R_c \gamma \quad (3)$$

Therefore, substituting Equations 2 and 3 into Equation 1:

$$M_{A'} = \Omega^2 M \{[(R_c + r_b) \cos \gamma - R_c + e][(R_c + r_b) \sin \gamma] \\ - [(R_c + r_b) \sin \gamma - R_c \gamma][(R_c + r_b) \cos \gamma - R_c]\} \quad (4)$$

This may be simplified to produce:

$$M_{A'} = \Omega^2 M [e r_b \sin \gamma + R_c (\gamma r_b \cos \gamma + e \sin \gamma) + R_c^2 (\gamma \cos \gamma - \gamma)] \quad (5)$$

For small values of $\gamma$:

$$\sin \gamma \cong \gamma \quad (6)$$

and $$\cos \gamma \cong 1 - \gamma^2/2 \quad (7)$$

Therefore, substituting Equations 6 and 7 into Equation 5:

$$M_{A'} = \Omega^2 M \left\{ er_b \gamma + R_c \left( \gamma r_b - \frac{\gamma^3 r_b}{2} + e\gamma \right) - \frac{R_c^2 \gamma^3}{2} \right\} \quad (8)$$

If $\gamma$ is small, the $\gamma^3$ terms are insignificant and may be neglected to produce:

$$M_{A'} = \Omega^2 M \gamma [er_b + R_c(r_b + e)] \quad (9)$$

Or, $$M_{A'} = K\gamma \quad (10)$$

where $$K = \Omega^2 M [er_b + R_c(r_b + e)] \quad (11)$$

Equation 10 will be recognized as the equation for a torsion spring where $M_{A'}$ equals the torque or moment produced by an angular deflection $\gamma$, and K equals the spring constant. It other words the centrifugal force acting on the blade produces a restoring moment on the blade which is equal to the spring constant times the lead or lag angle of the blade. The retention means thus acts dynamically to produce substantially the same results as would the addition of mechanical springs to a more conventional retention having a fixed pivot for the lead or lag motion.

More importantly, it should be noted that the spring constant K is a function of the speed of hub rotation ($\Omega$) and of the radius of curvature ($R_c$) of the pin 48. Therefore, since the natural frequency of the blade is a function of the spring constant, the natural frequency of the blade changes with changes in the speed of hub rotation. By proper design of the curvature ($R_c$) of the pin the blade can therefore be made to have at all operating speeds a natural frequency different from the periodic driving forces produced as a result of the rotor rotation, thereby eliminating the possibility of resonant blade vibration at different critical speeds of the rotor hub.

As will be noted from above, the spring constant K for a given speed of hub rotation is independent of the blade deflection $\gamma$. The dynamic effect on the blade is therefore that of a linear spring. If desired, however, a non-linear spring effect may be obtained by changing the curvature of the pin from a circular to a non-circular shape so that its radius of curvature at the point of contact with the opening in the hub mounting arm changes as the pin rolls or rocks relative to the hub.

In FIGS. 3, 4 and 5 the maximum diameter of the pin 48 is shown to occur at its transverse center so as to allow the blade to move substantially equal amounts in the lead and lag directions. This however is not a necessary condition to the invention, and the point of maximum diameter may, if desired, be designed to fall to one side or the other of the transverse center of the pin so as to allow a greater range of blade movement in the lag direction than in the lead direction, or vice versa.

*Alternative Blade Retention Means—FIGS. 7 to 12*

Although FIG. 3 shows in detail the preferred embodiment of the blade retention means of this invention, various other different arrangements may be employed to obtain substantially the same desirable dynamic characteristics.

The general condition necessary to this invention is the provision in the blade retention means of means whereby the lead and lag pivot axis shifts with a change in the lead or lag position of the blade. This shifting of the pivot axis is best obtained by providing two coengaging bearing surfaces fixed relative to the hub and the blade, respectively. At the point of contact the bearing surface fixed relative to the blade faces generally outwardly toward the tip of the blade and the bearing surface fixed relative to the hub faces generally inwardly toward the hub axis. At least one of these bearing surfaces is curved in the path of blade rotation and by a degree different from that of the other surface so that the blade as it moves in the lead and lag direction causes one of the bearing surfaces to roll relative to the other, thereby shifting the location of the contact between the two surfaces.

In the FIG. 3 embodiment of the invention, the pin 48 as mentioned, is a body of revolution so as to have a circular cross section at all points along its length. The opening in the hub mounting arm is in addition cylindrical in shape so that both of the bearing surfaces are curved in a plane perpendicular to the path of blade rotation. The outer surface 74 of the pin is curved along its length or in the path of the blade rotation, whereas the inner surface 73 of the mounting arm is straight in the path of the blade rotation. The pin therefore contacts the hub mounting arm at a point contact which shifts in the plane perpendicular to the path of blade rotation in accordance with the flapping motion of the blade. If desired, however, the retention may be designed to provide for a line contact between the two coengaging bearing surfaces thereby decreasing the bearing pressure.

FIGS. 7 to 12 show schematically three different retention means designed to provide a line contact between the two bearing surfaces. In the construction of FIGS. 7 and 8, the hub mounting arm 88 is provided with a transverse opening having a rearwardly facing bearing surface 90 generated by a straight line perpendicular to the path of blade rotation. That is, the surface 90 is perpendiclar to the path of rotation. Also, the surface 90 is flat in the path of rotation, but this is not necessary and it could be curved in one direction or the other. Associated with the hub mounting arm 88 is a blade 92 provided with a blade grip 94 having a transverse part or portion 96 which fits through the opening in the mounting arm 88. The portion 96 has an outwardly facing bearing surface 98 which is also generated by a straight line perpendicular to the path of blade rotation and which is curved in a path of blade rotation by a degree different from the surface 90. The two surfaces 90 and 98 therefore coengage along a straight line, perpendicular to the path of blade roation as shown in FIG. 8, and due to the difference in curvature this line of contact will shift as the blade 92 swings in the lead and lag directions due to a rolling motion of the surface 98 relative to the surface 90. In order to provide for a flapping motion of the blade 92 the hub mounting arm 88 may be pivoted to the hub 100 by a suitable hinge means as indicated at 102.

In the embodiment of FIGS. 9 and 10 the hub mounting arm 104 is provided with an opening 106 arranged generally parallel to the axis of hub rotation and generally cylindrical in shape. Associated with the mounting arm 104 is a blade 108 having a grip 110 provided with a portion 112 which passes through the opening 106. The portion 112 is generally cylindrical in shape, but has a substantially smaller diameter than the opening 106. Swinging motion of the blade 108 in the lead and lag directions will therefore cause the portion 112 to roll relative to the surface of the opening 106 to change the location of the contact between the two bearing surfaces. As shown in FIG. 10 the grip 112 engages the hub mounting arm 104 along a straight line due to the cylindrical nature of the portion 112 and the opening 106. Both the surface of the portion 112 and the surface of the opening 106 are perpendicular to the path of blade rotation and generated by straight lines perpendicular to the path of blade rotation. To permit flapping motion of the blade 108 the mounting arm 104 may be pivotally connected to the hub 114 by a suitable hinge means such as shown at 116.

In the embodiment of FIGS. 11 and 12, the hub mounting arm 118 is provided with an opening 120 having a curved inwardly facing bearing surface 122, the bearing surface 122 being generally cylindrical in shape. Associated with the mounting arm 118 is a blade 124 having a grip 126 provided with a portion 128 passing through the opening 120. The portion 128 has a curved outwardly facing bearing surface 130 which engages the bearing surface 122. The surface 130 is generally cylindrical in shape, at least in its zone of contact with the bearing surface 122 and has a substantially larger radius of curvature than the surface 122. Therefore, as the blade 124 swings relative to the hub mounting arm 118 in the lead or lag direction the surface 130 will roll relative to the surface 122 to cause a shift in the location of the lead and lag pivot axis. The surface 122 engages the surface 130 along a straight line as shown in FIG. 12. To permit flapping movement of the blade 124, the hub mounting arm 118 may be pivotally connected to the hub 132 by means of a suitable hinge connection such as shown at 134.

The invention claimed is:

1. In a rotor assembly, the combination comprising a hub adapted for rotation about a given axis, a blade extending generally radially outwardly from said hub, and means connecting the inboard end of said blade to said hub for imparting the rotation of said hub to said blade and for permitting lead and lag swinging motion of said blade relative to said hub in the path of the blade rotation, said connecting means including means for resisting transverse movement of said inboard blade end relative to said hub and further including means defining a generally outwardly facing bearing surface fixed relative to said blade and a generally inwardly facing bearing surface fixed relative to said hub which bearing surfaces coengage to restrain said inboard blade end against radial outward movement relative to said hub, at least one of said bearing surfaces being curved in the path of blade rotation and by a degree different from the other surface so that movement of said blade in one direction relative to said hub and in said plane of rotation causes one of said bearing surfaces to roll over the other and thereby shifts the momentary lead and lag pivot axis in the opposite direction relative to said hub and about said given axis in direct relation to the movement of said blade relative to said hub.

2. The combination as defined in claim 1 further characterized by both of said bearing surfaces being curved in a plane generally perpendicular to the path of blade rotation to cause a shifting of the contact between said two surfaces in accordance with the flapping motion of said blade.

3. In a rotor assembly, the combination comprising a hub adapted for rotation about a given axis and having a radially outwardly extending mounting arm provided with an opening therethrough which opening is arranged generally perpendicular to said given axis, a blade extending generally radially outwardly from said mounting arm and having a connecting part at its inboard end which part passes through said opening to connect said blade assembly to said mounting arm, and means for resisting movement of said connecting part along the length of said opening, said connecting part being engageable with the wall of said opening to restrain said blade assembly against radial outward movement and said part and said opening having different degrees of curvature in the zone of coengagement and in the path of blade rotation so that movement of said blade in one direction relative to said hub and in said plane of rotation causes one of said bearing surfaces to roll over the other and thereby shifts the momentary lead and lag pivot axis in the opposite direction relative to said hub and about said given axis in direct relation to the movement of said blade relative to said hub.

4. The combination as defined in claim 3 further characterized by said opening in said mounting arm being generally cylindrical in shape and said blade part which passes through said opening having a generally barrel-shaped portion which portion engages the wall of said opening to permit lead and lag motion of said blade assembly relative to said hub as a result of rolling motion between said barrel-shaped portion and said opening wall.

5. In a rotor assembly the combination comprising a hub member adapted for rotation about a given axis, a blade member extending generally radially outwardly from said hub member for rotation therewith, and means for connecting said blade member to said hub member for imparting the rotation of said hub member to said blade member and which connecting means permits said blade member to partake of lead and lag motion relative to said hub member in the path of blade rotation, said connecting means including a pair of spaced mounting arms on one of said members and a single mounting arm on the other of said members positioned between said pair of arms, a transverse opening in said single mounting arm, a transverse pivot member carried by said pair of mounting arms which pivot member extends between said pair of arms and through said transverse opening in said single mounting arm, and means interposed between each side of said single mounting arm and the adjacent one of said pair of mounting arms for resiliently resisting transverse movement of said pair of arms relative to said single arm, said opening and said pivot member defining respectively a pair of coengaging bearing surfaces which surfaces are of different curvature in the path of blade rotation so that said blade member is able to move in the lead and lag direction as a result of rolling motion between said two bearing surfaces which rolling motion changes the location of the contact between said two surfaces.

6. The combination as defined in claim 5 further characterized by said opening in said single mounting arm being generally cylindrical in shape, and said pivot member being a pin having a barrel-shaped portion received by said opening.

7. The combination as defined in claim 6 further characterized by bearing means between said pin and said pair of mounting arms for supporting said pin for rotation relative to said pair of arms to permit flapping motion of said blade member as a result of said relative rotation.

8. In a rotor assembly, the combination of a hub adapted for rotation about a given axis and having a radially outwardly extending mounting arm provided with a generally cylindrical transverse opening, a blade extending radially outwardly from said mounting arm and including a blade grip at its inboard end which blade grip is bifurcated to provide two transversely spaced arms located on opposite sides of said hub mounting arm, and a pivot pin carried by said two grip arms and extending through said mounting arm opening, said pivot pin having a portion intermediate its ends which portion engages the wall of said mounting arm opening to restrain said blade against radial outward movement and which portion is curved along its length to permit a rocking motion of said pin relative to said opening wall and a consequent lead or lag motion of said blade.

9. The combination defined in claim 8 further characterized by two resilient means located one on either side of said mounting arm and between said mounting arm and the adjacent blade grip arm for urging said blade grip toward a centered position relative to said mounting arm and for resiliently resisting its movement from said centered position.

10. The combination defined in claim 8 further characterized by two rings of resilient material surrounding said pin and located one on either side of said mounting arm and between said mounting arm and the adjacent blade grip arm, said rings being of such size in their undeformed condition as to be held in a compressed state by said mounting and blade grip arms and to thereby resiliently urge said blade grip to a centered position relative to said mounting arm.

11. The combination defined in claim 8 further characterized by bearing means between said pin and said two blade grip arms for supporting said blade grip arms for rotation about the axis of said pin to allow flapping motion of said blade relative to said hub.

12. The combination defined in claim 11 further characterized by said bearing means including two cylindrical portions located one on each end of said pin, and a series of anti-friction roller bearing elements between each of said cylindrical portions and the associated blade grip arm, each of said cylindrical portions constituting an inner race for the associated bearing elements.

13. In a rotor assembly, the combination comprising a hub adapted for rotation about a given axis, a blade extending generally radially outwardly from said hub, and means connecting said blade to said hub for permitting lead-lag motion of said blade relative to said hub about a lead-lag axis and for causing said lead-lag axis to move angularly relative to said hub and about said given axis in direct relation to the movement of said blade about said lead-lag axis and in such a manner that said lead-lag axis is moved in the lead direction about said given axis as said blade is moved in the lag direction about said lead-lag axis.

References Cited in the file of this patent

UNITED STATES PATENTS

| | | |
|---|---|---|
| 2,151,216 | Larsen | Mar. 21, 1939 |
| 2,169,849 | Pitcairn | Aug. 15, 1939 |
| 2,423,733 | Stalker | July 8, 1947 |
| 2,672,941 | Jovanovich | Mar. 23, 1954 |

FOREIGN PATENTS

| | | |
|---|---|---|
| 53,930 | France | Aug. 5, 1946 |
| 479,461 | Great Britain | Feb. 7, 1938 |